J. Dennison
Tide Wheel.
No. 92,800. Patented Jul. 20, 1869.
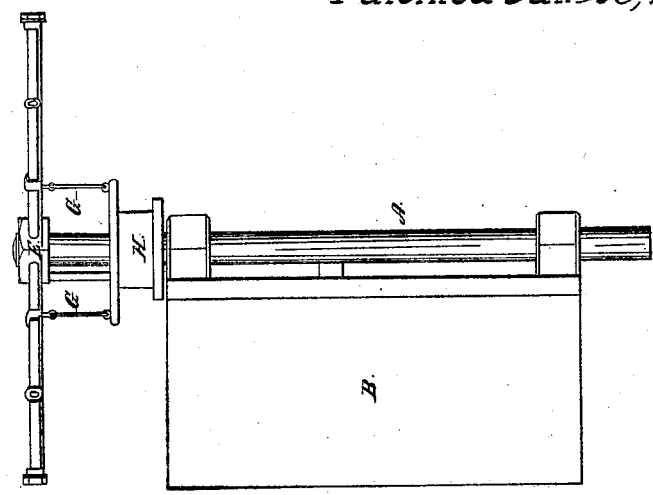
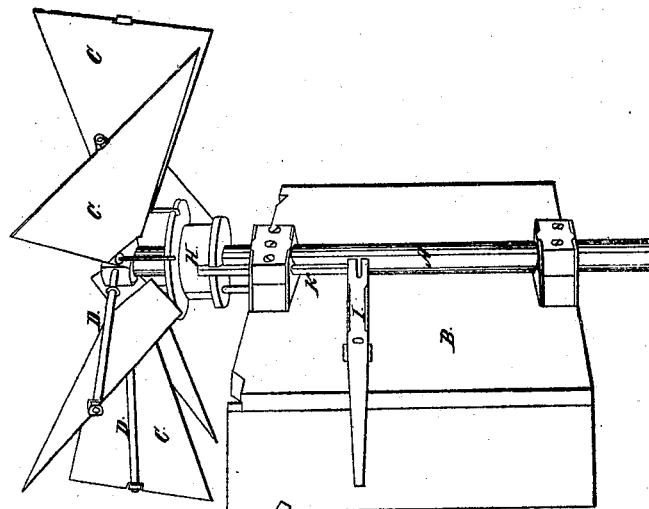
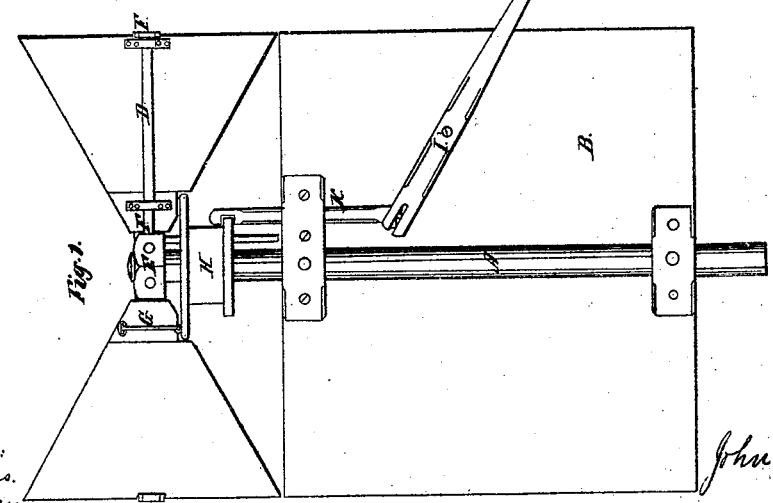
Witnesses:
James F. Briggs.
Wm. H. Clanahan
Inventor:
John Dennison

United States Patent Office.

JOHN DENNISON, OF HILLSBOROUGH, NEW HAMPSHIRE.

Letters Patent No. 92,800, dated July 20, 1869.

IMPROVEMENT IN CURRENT-WHEELS.

The Schedule referred to in these Letters Patent and making part of the same.

*To all whom it may concern:*

Be it known that I, JOHN DENNISON, of Hillsborough, in the county of Hillsborough, and State of New Hampshire, have invented a new and improved Current-Wheel; and I do hereby declare that the following is a full, clear, and exact description thereof, which will enable others skilled in the art to make and use the same, reference being had to the accompanying drawing, forming part of this specification.

This invention relates to improvements in current-wheels, having for its object to provide an improved feathering arrangement of the buckets, calculated to adapt the wheel for application to the current, either transversely or longitudinally; also for spreading the buckets to be acted on by the water, or for adjusting them, so as not to be acted on, as hereinafter more fully described.

Figure 1 represents a plan view of my improved wheel when adjusted for action transversely of the current.

Figure 2 represents a perspective view when adjusted for application longitudinally.

Figure 3 represents a side elevation with the buckets adjusted so as not to have motion from the water.

Similar letters of reference indicate corresponding parts.

A represents the shaft, which I support on any suitable raft or float B, with one end overhanging the said float, and supporting the buckets or vanes C, upon the radiating arms D, firmly fixed in a hub, E. The said vanes are connected to the arms by bands or loops F, looping around the arms in a manner to permit the vanes to oscillate freely for feathering or adjusting the sides of the vanes, either parallel with the shaft or obliquely thereto.

I connect each vane, near the hub of the wheel, by links or rods G, to the rim of a sliding-collar, H, which rotates with the shaft.

To this collar I connect a shifting-lever, I, by a rod, K, so arranged that I may slide the collar for adjusting the vanes while in motion, and in this way I may open or adjust the buckets to receive the force of the water, or adjust them edgewise thereto, so as not to be exposed to it.

By this means they are also adjusted for application of the wheel transversely or longitudinally to the current, as clearly shown in figs. 1 and 2.

Having thus described my invention,

What I claim as new, and desire to secure by Letters Patent, is—

The combination, with the shaft A, of the fixed arms D, adjustable buckets C, sliding collar H, connecting-rods G, and shifting-lever I, when all constructed and arranged substantially as specified.

JOHN DENNISON.

Witnesses:
    JAMES F. BRIGGS,
    WINFIELD S. HEAL.